United States Patent
Gandhi et al.

(10) Patent No.: US 12,439,395 B2
(45) Date of Patent: Oct. 7, 2025

(54) OPPORTUNISTIC STANDARD POWER GRANT BY AUTOMATED FREQUENCY COORDINATION

(71) Applicant: Cisco Technology, Inc., San Jose, CA (US)

(72) Inventors: Indermeet S. Gandhi, San Jose, CA (US); Sudhir K. Jain, Fremont, CA (US)

(73) Assignee: Cisco Technology, Inc.

( * ) Notice: Subject to any disclaimer, the term of this patent is extended or adjusted under 35 U.S.C. 154(b) by 378 days.

(21) Appl. No.: 18/193,450

(22) Filed: Mar. 30, 2023

(65) Prior Publication Data

US 2024/0334416 A1    Oct. 3, 2024

(51) Int. Cl.
*H04W 72/044* (2023.01)
*H04B 17/10* (2015.01)
*H04W 72/0453* (2023.01)

(52) U.S. Cl.
CPC ...... *H04W 72/0473* (2013.01); *H04B 17/102* (2015.01); *H04W 72/0453* (2013.01)

(58) Field of Classification Search
CPC ......... H04W 72/0473; H04W 72/0453; H04W 64/003; H04W 52/283; H04W 52/0206; H04W 64/00; H04W 84/12; H04B 17/102
See application file for complete search history.

(56) References Cited

U.S. PATENT DOCUMENTS

| | | |
|---|---|---|
| 2009/0022127 A1 | 1/2009 | Traynor et al. |
| 2020/0367020 A1* | 11/2020 | Ansley ............... H04W 16/14 |
| 2021/0058856 A1 | 2/2021 | Qi et al. |
| 2021/0068070 A1 | 3/2021 | Segev et al. |
| 2021/0120556 A1* | 4/2021 | Segev ................... H04W 28/16 |
| 2022/0272544 A1 | 8/2022 | Chitrakar et al. |
| 2022/0329979 A1 | 10/2022 | Ansley et al. |
| 2024/0098615 A1* | 3/2024 | Anantharaman . H04W 72/0473 |

\* cited by examiner

*Primary Examiner* — Christopher M Brandt
(74) *Attorney, Agent, or Firm* — Merchant & Gould P.C.

(57) ABSTRACT

Opportunistic power grant, and specifically to providing opportunistic power grants to Access Points (APs) by an Automated Frequency Coordination (AFC) may be provided. An Access Point may be operating in a low power mode. The AP may connect to a STA and send a token to the STA, wherein the token includes a request for a STA location. The AP may receive the STA location in response. The AP may send the token and the STA location to an AFC. The AP may then receive instructions to operate in a standard power mode from the AFC. The AP may change operation to the standard power mode in response.

20 Claims, 5 Drawing Sheets

OPPORTUNISTIC STANDARD POWER GRANT BY AUTOMATED FREQUENCY COORDINATION

TECHNICAL FIELD

The present disclosure relates generally to providing opportunistic power grant and, specifically, to providing opportunistic power grants to Access Points (APs) by an Automated Frequency Coordination (AFC).

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Opportunistic power grant, and specifically to providing opportunistic power grants to Access Points (APs) by an Automated Frequency Coordination (AFC) may be provided. An Access Point may be operating in a low power mode. The AP may connect to a Station (STA) and send a token to the STA, wherein the token includes a request for a STA location. The AP may receive the STA location in response. The AP may send the token and the STA location to an AFC. The AP may then receive instructions to operate in a standard power mode from the AFC. The AP may change operation to the standard power mode in response.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

An Access Point (AP) operating in the 6 Gigahertz (GHz) band may operate in two Unlicensed National Information Infrastructure (U-NII) bands, the U-NII-5 band and the U-NII-7 band (e.g., as allowed by the Federal Communications Commission's (FCC) rules and regulations). An Automated Frequency Coordination (AFC) may control the frequency and/or transmission power grant of the AP.

An AP may operate in a low power mode or a standard power mode. When an AP is indoors and needs to operate in a standard power mode, the AP may need to report its location to the AFC. The AFC may determine whether transmissions by the AP at the reported location in the standard power mode will cause interference. If the AP transmissions will not cause interference or will not cause an unacceptable level of interference, the AFC may allow the AP to operate in a standard power mode. If the AP transmission will cause interference (e.g., an unacceptable level of interference), the AFC may restrict the operation of the AP to a low power mode.

APs may not include location determination systems, and adding components and/or additional systems for an AP to determine its location may introduce additional complexity and cost. For example, adding a Global Positioning System (GPS) module in each AP may increase the cost of network installation and/or operation. Other approaches, such as installing a GPS in a location near multiple APs with complex functions to calculate locations of the multiple APs may still introduce complexity and additional costs. For example, the GPS may require high touch engagements and system integrators to determine AP positions, and the GPS must be installed and operating.

Figure 1:
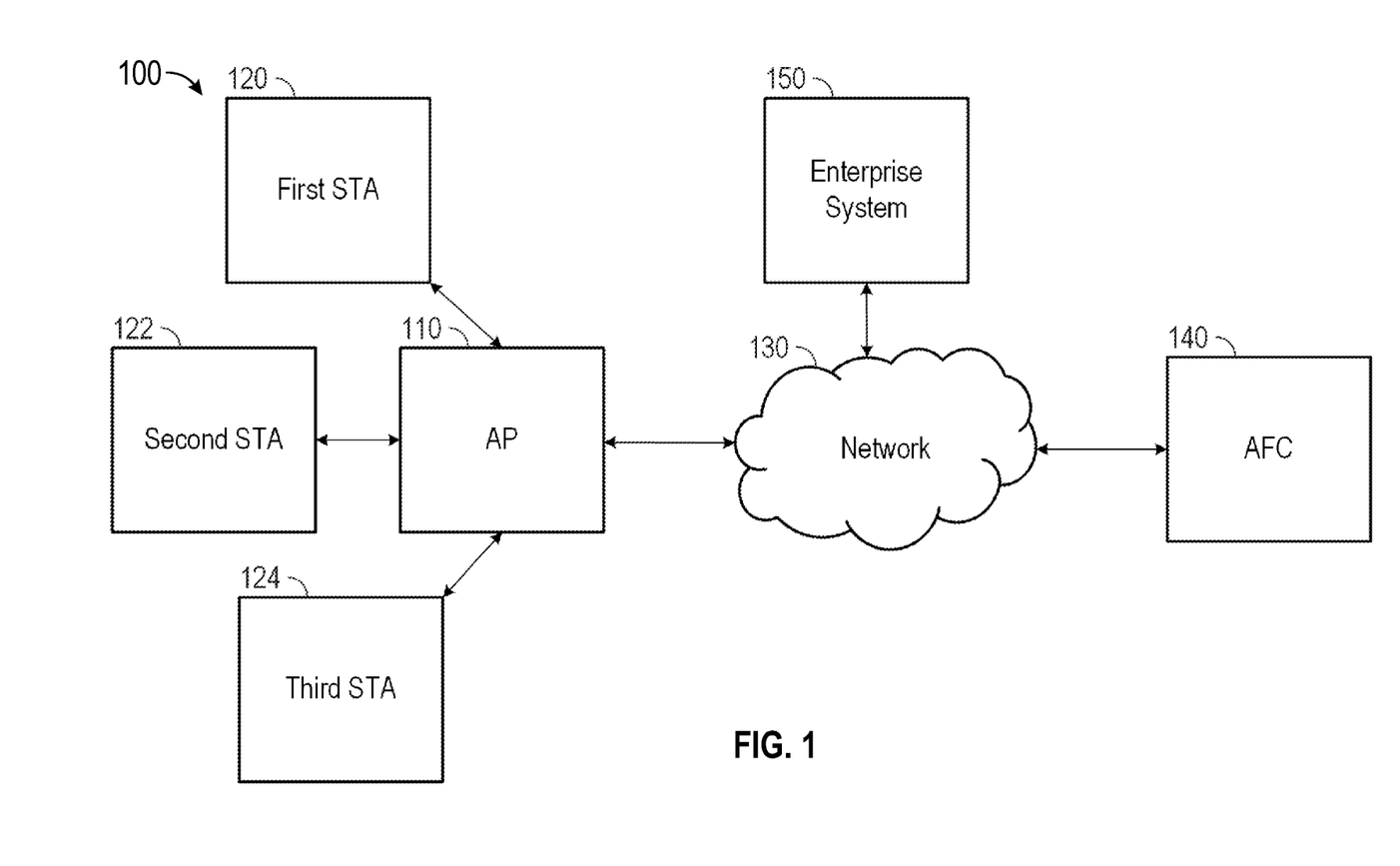
FIG. 1 is a block diagram of an operating environment for opportunistic power grant.

FIG. 1 is a block diagram of an operating environment 100 for opportunistic power grant. The operating environment 100 may include an AP 110, a first Station (STA) 120, a second STA 122, a third STA 124, a network 130, an AFC 140, and an enterprise system 150. The AP 110 may allow devices (e.g., the first STA 120, the second STA 122, the third STA 124) to access the network 130. The AFC 140 and/or the enterprise system 150 may control the operation of the AP 110. The enterprise system 150 may be a proxy server for the AFC 140, a Wireless Local Area Network Controller (WLC), a Network Access Control (NAC), a Mobile Device Management (MDM) server, and/or the like.

Thus, the AP 110 may communicate with the enterprise system 150 directly rather than via the network 130 in some examples.

The AP 110 may operate in a low power mode or a standard power mode. The AP 110 may operate in the low power mode by default when operating in a certain band, such as the 6 GHz band. To operate in the standard power mode, the AP 110 may need to communicate with the AFC 140, via the network 130 for example, and receive permission from the AFC 140 to operate in the standard power mode.

When the AP 110 begins operation, the AP 110 may generate a token. Additionally, the token may have a validity period (e.g., 24 hours) and expire after the validity period. The AP 110 may generate a new token once the previous token expires, when the AP 110 reboots, and/or when the AP 110 is moved. Thus, the AP 110 may always have a valid token when operating.

The AP 110 may register with the AFC 140, including sharing an identifier associated with the AP 110 (e.g., a Basic Service Set Identifier (BSSID)) and the valid token. The AP 110 may not have its location when registering with the AFC 140, so the AFC 140 may set the AP's 110 location as unknown. The AFC 140 may require the AP 110 operates in the low power mode until the location is known. The AP 110 may send a new valid token to the AFC 140 when the previous valid token expires.

When a STA (e.g., the first STA 120, the second STA 122, the third STA 124) connects to the AP 110, the AP 110 may send the active token to the STA. The AP 110 may send a new valid token to the STA when the previous valid token expires. In some examples, the AP 110 may share the token with the STA connecting to the AP 110 only if the STA signals to the AP 110 that the STA is capable of reporting its location to the AP 110, the AFC 140, and/or the enterprise system 150. For example, the first STA 120, the second STA 122, and the third STA 124 may all connect to the AP 110, but only the first STA 120 and the second STA 122 may be able to report the respective location. Thus, the AP 110 may send the token to the first STA 120 and the second STA 122 but not the third STA 124.

The AP 110 may also determine whether to send the token to an STA based on whether the AP 110 determines to operate in the standard power mode, for example because the AP 110 cannot provide adequate coverage while operating in the low power mode (e.g., one or more STAs connected to the AP 110 have poor Received Signal Strength Indicator (RSSI) and/or Modulation and Coding Scheme (MCS)). For example, the AP 110 may share the active token with a STA connected to the AP 110 using a lower data rate band (e.g., a 2.4 GHz band), and the STA may trigger an application which requires a bandwidth that the AP 110 cannot effectively provide coverage when operating in a low power mode (e.g. triggering video streaming or a Virtual Reality application). Thus, the AP 110 may determine to operate in the standard power mode. The AP 110 may determine to operate in the standard power mode to and, in response, share the token with one or more STAs capable of location reporting connected to the AP 110. Therefore, the AP 110 may delay sharing the token with any STAs until the AP 110 determines to switch to the standard power mode rather than when a STA connects to the AP 110. The AP 110 may still only share tokens with STAs that indicate that the STA location can be reported.

The AP 110 may also only share tokens with authorized STAs. The AP 110 and/or the enterprise system 150 may configure which STAs are authorized STAs and which STAs are not authorized STAs. An STA may be an authorized STA if the STA is a managed client, if the STA is using a MDM application, and/or the like. Therefore, the AP 110 may share tokens with authorized STAs that are capable of location reporting when the STAs connect to the AP 110 and/or when the AP 110 determines to switch to the standard power mode.

An STA may determine its location using GPS, cellular signals, an accelerometer, a gyroscope, a geolocation Application Programming Interface (API), and/or the like. The STA may then determine the distance between the STA and the AP 110, using Fine Timing Measurement (FTM), Ultra-Wideband (UWB), RSSI, MCS levels, and/or the like. For example, the first STA 120 may receive the token from the AP 110. In response, the first STA 120 may determine its location and/or the distance between the STA and the AP 110. In some examples, the AP 110 determines the distance between the STA and the AP 110. In further examples, the AFC 140 determines the distance between the STA and the AP 110, for example using the STA location, FTM values, UWB values, RSSI, and/or MCS levels received from the STA.

Once the STA determines the STA location and/or the distance between the STA and the AP 110, the STA may send the STA location, the distance between the STA and the AP 110, and the token to the AP 110. The AP 110 may then send the STA location, the distance between the STA and the AP, and the token to the AFC 140. The AP 110 may have sent the token to the AFC 140 previously, so the AP 110 may only send the STA location and the distance between the STA and the AP in some examples.

Alternatively, the STA may send the STA location, the distance between the STA and the AP 110, and the token directly or otherwise without using the AP 110 to the AFC 140. For example, the AP 110 may not be authorized to receive STA locations, so the STA may send the STA location, the distance between the STA and the AP, and the token to the AFC 140 without using the AP 110. In another example, the STA may send a secure communication to the AFC 140 (e.g., an encrypted signal) via the AP 110, so the AP 110 may not be able to determine the STA location and/or the distance between the STA and the AP 110 while the STA uses the AP 110 to use the network 130.

The AFC 140 may determine which AP is associated with the STA location and distance between the STA and the AP values using the token. The AFC 140 may then estimate or otherwise determine the location of the AP 110 using the STA location and the distance between the STA and the AP 110. The STA may also send RSSI and/or MCS levels to the AFC 140 when RSSI and/or MCS levels are used to determine the distance between the STA and the AP 110. The AFC 140 may assign an uncertainty factor to the location of the AP 110 using the distance between the AP and STA, the RSSI, and/or MCS levels. The uncertainty factor may represent the level of confidence the AFC 140 has that the estimated AP location is correct. The AFC 140 may determine that the AP 110 location uncertainty factor is too high for allowing the AP 110 to function in the standard power mode, for example because the AFC 140 cannot determine if the AP 110 will interfere with other devices based on the uncertain position of the AP 110. The AFC 140 may use the multiple STA locations and distances between STAs and the AP 110 to reduce the uncertainty and more effectively determine the location of the AP 110. For example, the uncertainty factor may be higher when only values reported from the first STA 120 are used compared to using values from the first STA 120 and the second STA 122 and/or the third STA 124.

In some examples, the AFC 140 may query the AP 110 to determine if the STA that sent the STA location and the distance between the STA and the AP 110 was connected to the AP 110 when the STA sent the values. The AFC 140 may perform the query to confirm that the received values are valid.

Once the AFC 140 determines the location of the AP 110, determines the uncertainty factor is acceptable, and/or queries the AP 110 as described above, the AFC 140 may determine whether the AP 110 will cause interference (e.g., interfering with other APs and/or devices near the AP 110). When the AFC 140 determines the AP 110 operating in the standard power mode will not cause interference or will cause an acceptable level of interference, the AFC 140 may inform the AP 110 that the AP 110 can operate in the standard power mode (e.g., with higher power in U-NII-5 and U-NII-7 bands). The AFC 140 may also provide a list of available channels and Effective Isotropic Radiated Power (EIRP) for the standard power mode of operation. In response to receiving the approval from the AFC 140, the AP 110 may transition to operating in the standard power mode, and may therefore improve coverage and capacity for the first STA 120, the second STA 122, and/or the third STA 124. The AP 110 may configure the operation in the standard power mode based on the list of available channels and EIRP.

In an alternative procedure, the methods described above may be followed, but the STA locations and distances between STAs and the AP may be sent to the enterprise system 150 instead of the AFC 140. For example, STA locations and/or distances between STAs and the AP may not be shared directly with the AFC 140 for privacy reasons. The AP 110 may initially register with the enterprise system 150 for the enterprise system 150 to receive the STA locations and distances between STAs and the AP 110. The enterprise system 150 may estimate the location of the AP 110 using the methods described above with respect to the AFC 140. Once the enterprise system 150 determines the location of the AP 110, using the received STA locations and/or distances between STAs and the AP 110 for example, the enterprise system 150 may send the AP location to the AFC 140. The AFC 140 may then notify the AP 110 whether the AP 110 can operate in the standard power mode based on the AP location. In some examples, the AFC 140 notifies the enterprise system 150 that the AP 110 can operate in the standard power mode, and the enterprise system 150 notifies the AP 110 that the AP 110 can operate in the standard power mode.

In another alternative procedure, the methods described above may be followed, but the AP 110 may acquire the location of one or more STAs without using tokens when trying to operate in a standard power mode. The AP 110 may send the first STA 120, the second STA 122, and/or the third STA 124 a message (e.g., an Action Frame, an Information Element (IE)) instead of an active token to request the STA locations. The message may include a notification to the STA that providing the STA location to the AP 110 will boost the network coverage of the AP 110 because the AP 110 may operate in the standard power mode when the STA provides the STA location.

The STAs may determine the associated STA location in response to the message and send the STA location to the AP 110. The AP 110 may determine the distance between the STA and the AP 110. The AP 110 may then determine the AP location using the STA locations and/or the distances between the STA and the AP 110.

Once the AP 110 determines the AP location, the AP 110 may send the AP location to the AFC 140 or the enterprise system 150 to request operation in the standard power mode. The AFC 140 or the enterprise system 150 may then inform the AP 110 that the AP 110 may operate in the standard power mode.

Figure 2:
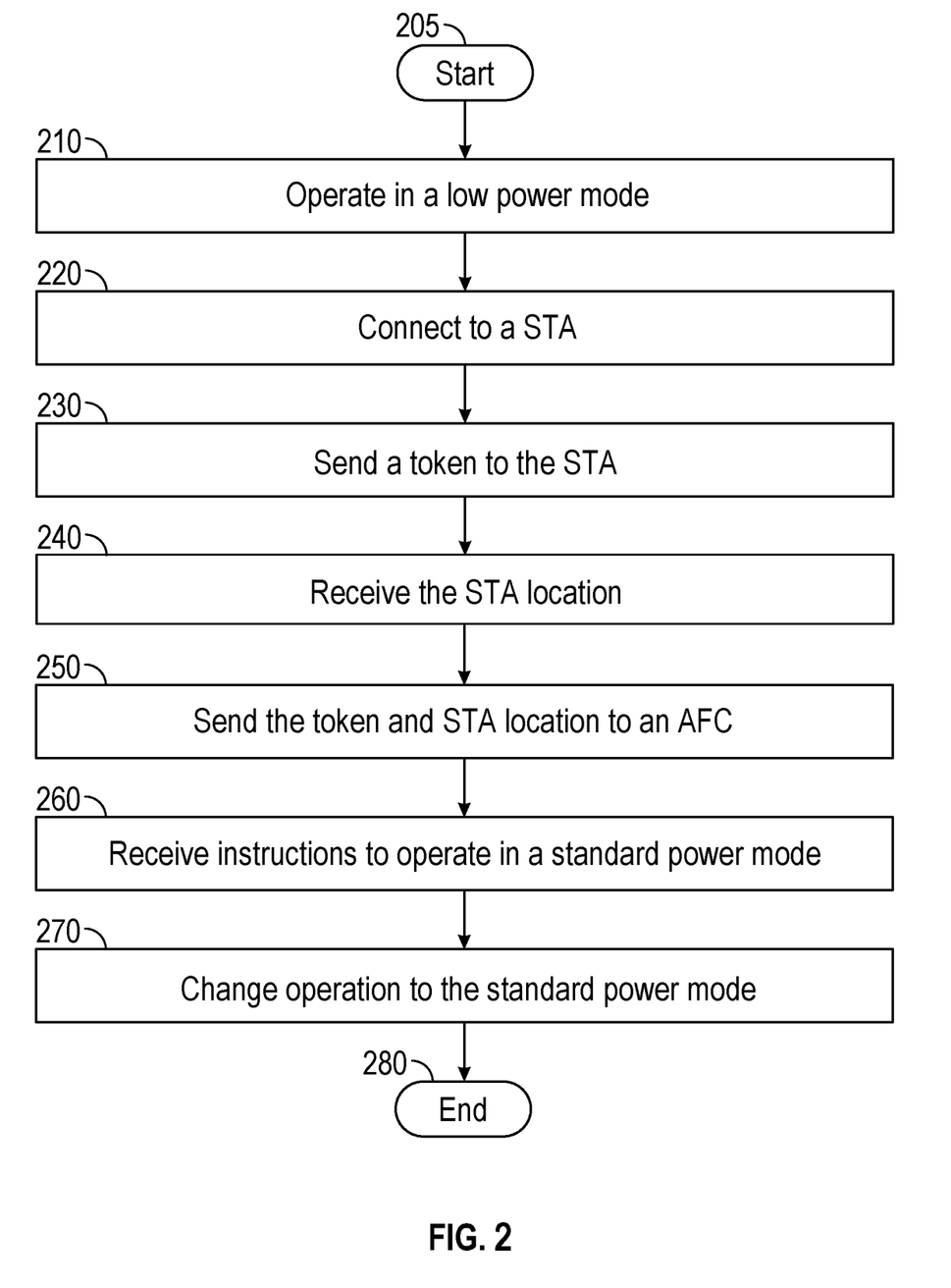
FIG. 2 is a flow chart of a method for opportunistic power grant.

FIG. 2 is a flow chart of a method 200 for opportunistic power grant. The method 200 may begin starting block 205 and proceed to operation 210. In operation 210, an AP may operate in a low power mode. For example, the AP 110 may operate in a low power mode. The AP 110 may also register with the AFC 140 and/or send a token to the AFC 140.

In operation 220, the AP may connect to an STA. For example, the first STA 120, the second STA 122, and/or the third STA 124 may connect to the AP 110. The STAs may connect to the AP 110 to use the network 130. Because the AP 110 is operating in the low power mode, the AP 110 may not be proving enough coverage and/or capacity for the first STA 120, the second STA 122, and/or the third STA 124. Thus, the AP 110 may determine to operate in a standard power mode.

In operation 230, a token may be sent to the STA. For example, the AP 110 may send the token to the first STA 120, the second STA 122, and/or the third STA 124, and sending the token may include includes a request for a STA location. The AP 110 may send the token in response to determining the STA is capable of location reporting, determining the STA is an authorized STA, and/or determining the AP 110 should operate in a standard power mode.

In operation 240, the STA location may be received. For example, the AP 110 may receive an STA location from the first STA 120, the second STA 122, and/or the third STA 124. The STAs may determine the STA location using the methods described above. The STAs may also determine the distance between the STA and the AP 110, and the AP 110 may also receive the distances. In another example, the STAs may send the STA locations directly to the AFC or send a secure communication via the AP 110 so the AP 110 cannot determine the STA locations.

In operation 250, the token and the STA location may be sent to an AFC. For example, the AP 110 or the STA may send the STA location to the AFC 140. The AFC 140 may use the token to associate the STA location with the AP 110 requesting to operate in the standard power mode.

In operation 260, instructions to operate in a standard power mode may be received from the AFC. For example, the AP 110 may receive the instructions to operate in the standard power mode from the AFC 140. The instructions may include a list of available channels and EIRP for operating in the standard power mode. The AFC 140 may determine to send the instructions to operate in the standard power mode based on determining the AP location using the STA location and/or distance between the STA and the AP 110 and determining whether the AP 110 can operate in the standard power mode.

In operation 270, operation may change to the standard power mode. For example, the AP 110 may change operation to the standard power mode in response to receiving the instructions in operation 260. The AP 110 may configure the operation in the standard power mode based on the list of available channels and EIRP. The method 200 may conclude at ending block 280.

Figure 3:
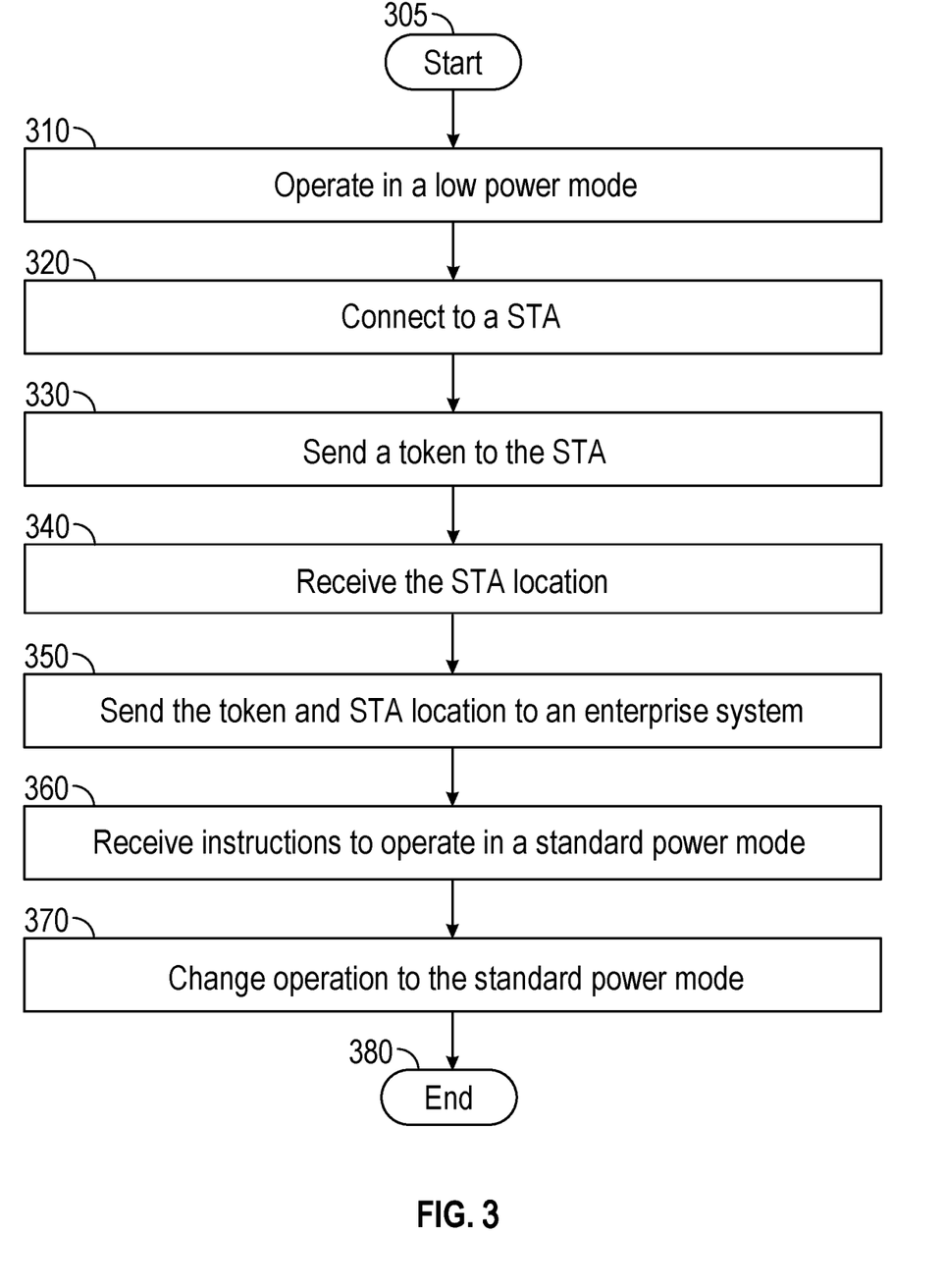
FIG. 3 is a flow chart of a method for opportunistic power grant including an enterprise system.

FIG. 3 is a flow chart of a method 300 for opportunistic power grant including an enterprise system. The method 300 may begin starting block 305 and proceed to operation 310. In operation 310, an AP may operate in a low power mode. In operation 320, the AP may connect to an STA. In operation 330, a token may be sent to the STA. In operation 340, the STA location may be received.

In operation 350, the token and STA location may be sent to an enterprise system. For example, the AP 110 may send the token and STA location to the enterprise system 150 instead of the AFC 140. As described above, the enterprise system 150 may determine the AP location and send a request, including the AP location, to the AFC 140 for the AP 110 to operate in the standard power mode.

In operation 360, instructions to operate in a standard power mode may be received. For example, the AP 110 may receive the instructions from the enterprise system 150 after the enterprise system 150 receives approval from the AFC 140.

In operation 370, operation may be changed to the standard power mode. For example, the AP 110 changes operation to the standard power mode. The method 300 may conclude at ending block 380.

Figure 4:
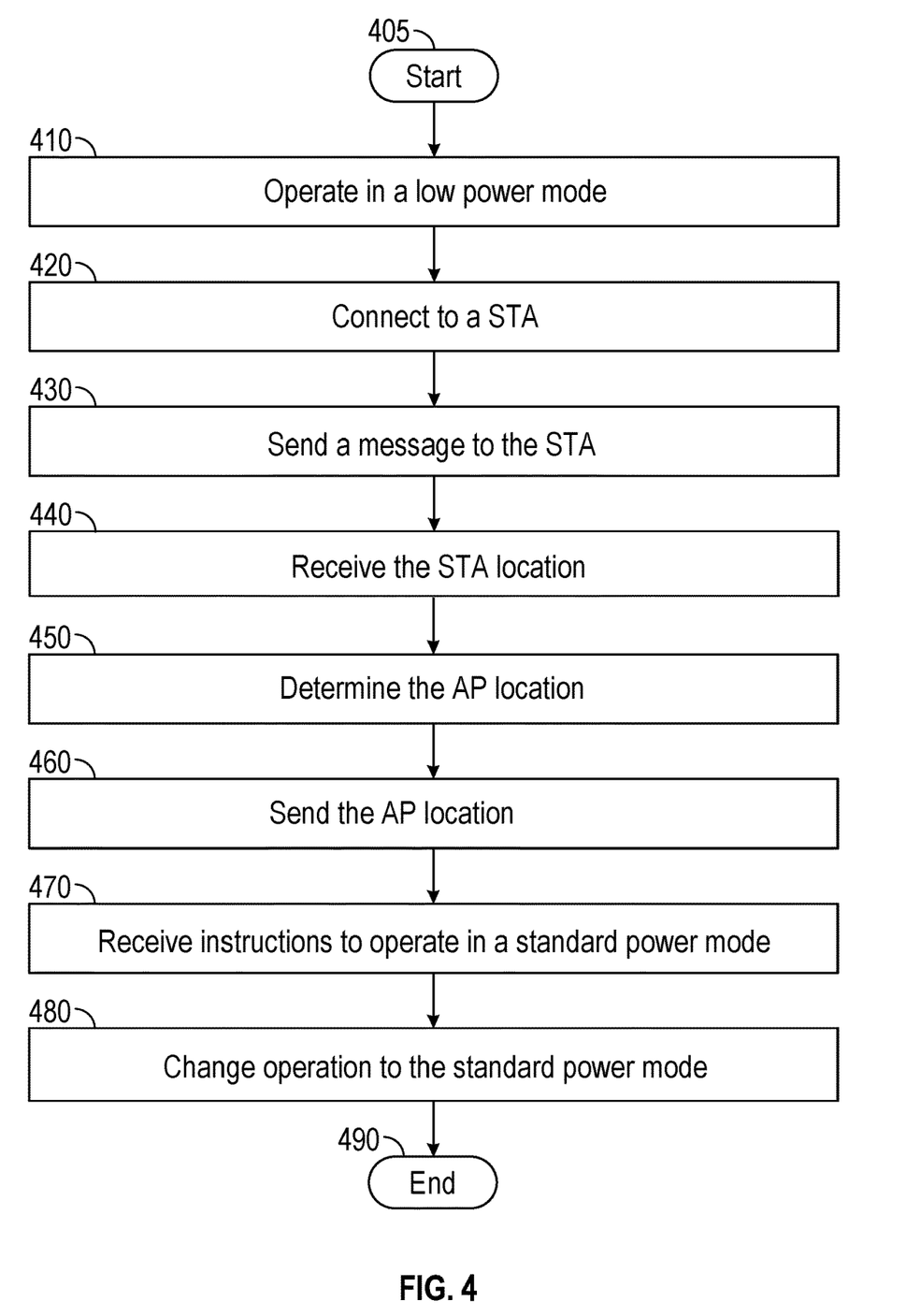
FIG. 4 is a flow chart of a method for opportunistic power grant including AP location determination by the AP.

FIG. 4 is a flow chart of a method 400 for opportunistic power grant including AP location determination by the AP. The method 400 may begin starting block 405 and proceed to operation 410. In operation 410, an AP may operate in a low power mode. In operation 420, the AP may connect to an STA.

In operation 430, a message may be sent to the STA. For example, the AP 110 may send a message (e.g., an Action Frame, an IE) to the first STA 120, the second STA 122, and/or the third STA 124. The message may include a request for the STA location. The message may also include a notification to the STA that providing the STA location to the AP 110 will boost the network coverage of the AP 110.

In operation 440, the STA location may be received. In operation 450, the AP location may be determined. For example, the AP 110 may determine the AP location using the STA locations. The AP 110 may also determine the distance between the STA and the AP and use the distance when determining the AP location.

In operation 460, the AP location may be sent. For example, the AP 110 may send the AP location to the AFC 140 or the enterprise system 150 to request changing operation to the standard power mode.

In operation 470, instructions to operate in a standard power mode may be received. For example, the AP 110 may receive the instructions from the AFC 140 or the enterprise system 150 after the AFC 140 determines the AP 110 can operate in the standard power mode based on the AP location.

In operation 480, operation may be changed to the standard power mode. For example, the AP 110 changes operation to the standard power mode. The method 400 may conclude at ending block 490.

Figure 5:
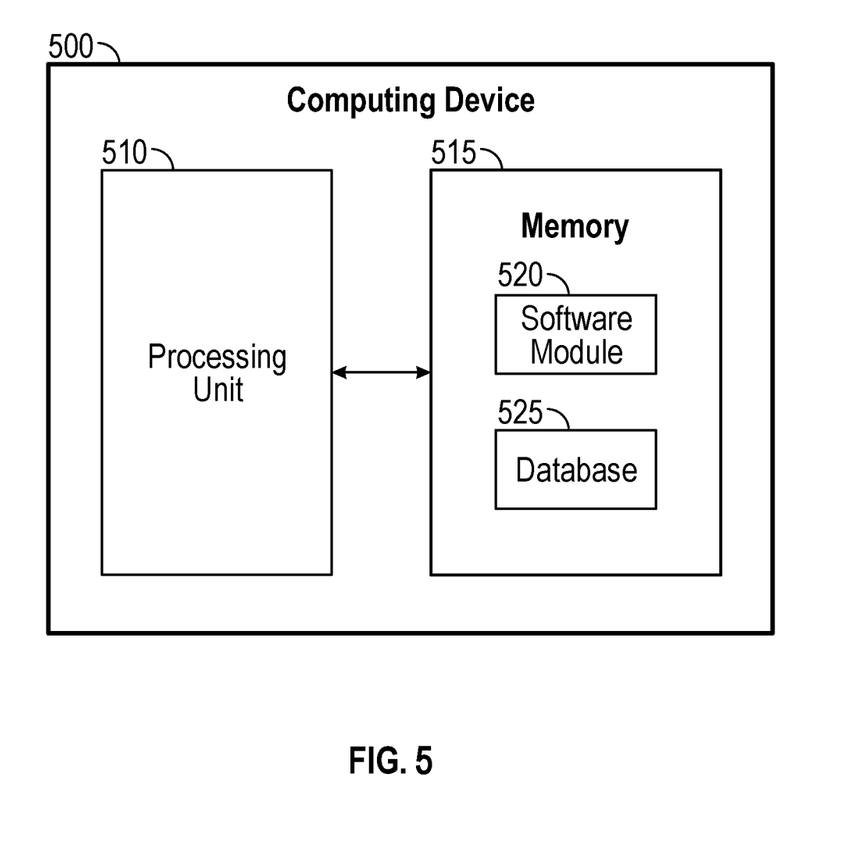
FIG. 5 is a block diagram of a computing device.

FIG. 5 is a block diagram of a computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for opportunistic power grant with respect to FIG. 1, FIG. 2, FIG. 3, and FIG. 4. Computing device 500, for example, may provide an operating environment for the AP 110, the first STA 120, the second STA 122, the third STA 124, the network 130, the AFC 140, the enterprise system 150, and the like. The AP 110, the first STA 120, the second STA 122, the third STA 124, the network 130, the AFC 140, the enterprise system 150, and the like may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   operating, by an Access Point (AP), in a low power mode;
   connecting to a Station (STA);
   sending a token to the STA, wherein the token includes a request for a STA location;
   receiving the STA location;
   sending the token and the STA location to an Automated Frequency Coordination (AFC);
   receiving instructions to operate in a standard power mode from the AFC; and
   changing operation to the standard power mode.

2. The method of claim 1, wherein the token further includes a request for a distance between the STA and the AP.

3. The method of claim 2, further comprising:
   receiving the distance between the STA and the AP; and
   sending the distance between the STA and the AP to the AFC.

4. The method of claim 1, wherein receiving the instructions to operate in the standard power mode from the AFC is in response to the AFC determining an AP location based on the STA location.

5. The method of claim 4, wherein receiving the instructions to operate in the standard power mode from the AFC is further in response to the AFC determining an uncertainty factor associated with the AP location.

6. The method of claim 1, further comprising:
   sending the token to one or more additional APs;
   receiving one or more additional STA locations; and
   sending the one or more additional STA locations to the AFC,
   wherein receiving the instructions to operate in the standard power mode from the AFC is in response to the AFC determining an AP location based on the STA location and the one or more additional STA locations.

7. The method of claim 1, further comprising determining the STA is capable of location reporting, wherein sending the token to the STA is in response to determining the STA is capable of location reporting.

8. The method of claim 1, further comprising receiving a list of available channels and Effective Isotropic Radiated Power (EIRP) for the standard power mode, wherein changing operation to the standard power mode is based on the list of available channels and EIRP.

9. A system comprising:
   a memory storage; and
   a processing unit coupled to the memory storage, wherein the processing unit is operative to:
     cause an Access Point (AP) to operate in a low power mode;
     connect to a Station (STA);
     send a token to the STA, wherein the token includes a request for a STA location;
     receive the STA location;
     send the token and the STA location to an Automated Frequency Coordination (AFC);
     receive instructions to operate in a standard power mode from the AFC; and
     change operation of the AP to the standard power mode.

10. The system of claim 9, wherein the token further includes a request for a distance between the STA and the AP.

11. The system of claim 10, the processing unit being further operative to:
    receive the distance between the STA and the AP; and
    send the distance between the STA and the AP to the AFC.

12. The system of claim 9, wherein to receive the instructions to operate in the standard power mode from the AFC is in response to the AFC determining an AP location based on the STA location.

13. The system of claim 12, wherein to receive the instructions to operate in the standard power mode from the AFC is further in response to the AFC determining an uncertainty factor associated with the AP location.

14. The system of claim 9, the processing unit being further operative to:
    send the token to one or more additional APs;
    receive one or more additional STA locations; and
    send the one or more additional STA locations to the AFC,
    wherein to receive the instructions to operate in the standard power mode from the AFC is in response to the AFC determining an AP location based on the STA location and the one or more additional STA locations.

15. A non-transitory computer-readable medium that stores a set of instructions which when executed perform a method executed by the set of instructions comprising:
    operating, by an Access Point (AP), in a low power mode;
    connecting to a Station (STA);

sending a token to the STA, wherein the token includes a request for a STA location;
receiving the STA location;
sending the token and the STA location to an Automated Frequency Coordination (AFC);
receiving instructions to operate in a standard power mode from the AFC; and
changing operation to the standard power mode.

16. The non-transitory computer-readable medium of claim 15, wherein the token further includes a request for a distance between the STA and the AP.

17. The non-transitory computer-readable medium of claim 16, the method executed by the set of instructions further comprising:
receiving the distance between the STA and the AP; and
sending the distance between the STA and the AP to the AFC.

18. The non-transitory computer-readable medium of claim 15, wherein receiving the instructions to operate in the standard power mode from the AFC is in response to the AFC determining an AP location based on the STA location.

19. The non-transitory computer-readable medium of claim 15, the method executed by the set of instructions further comprising:
determining the STA is capable of location reporting, wherein sending the token to the STA is in response to determining the STA is capable of location reporting.

20. The non-transitory computer-readable medium of claim 15, the method executed by the set of instructions further comprising:
receiving a list of available channels and Effective Isotropic Radiated Power (EIRP) for the standard power mode, wherein changing operation to the standard power mode is based on the list of available channels and EIRP.

* * * * *